Feb. 24, 1970
N. V. ROSS
3,497,658
METHOD AND APPARATUS FOR INDUCTION HEATING OF SLABS
Filed March 20, 1968
4 Sheets-Sheet 1
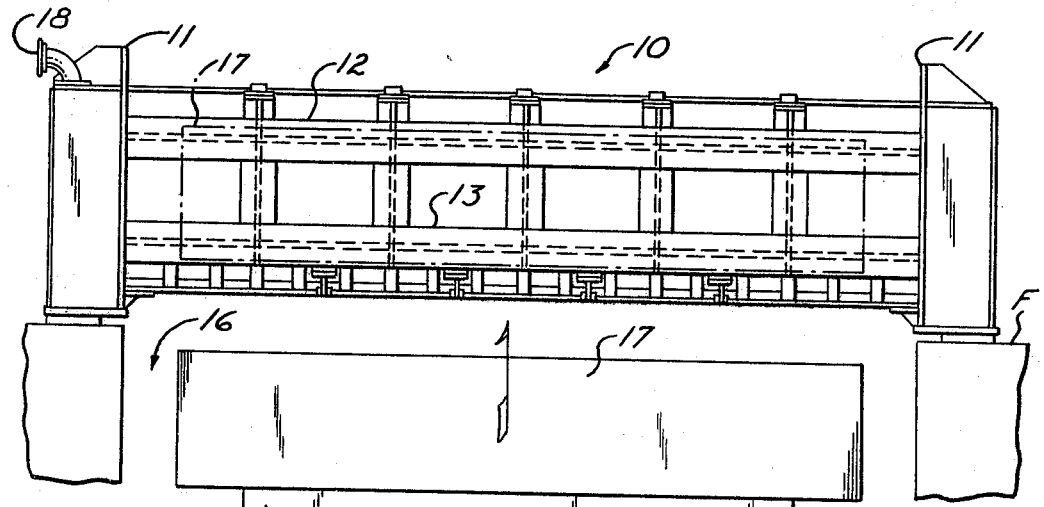
Fig. 1
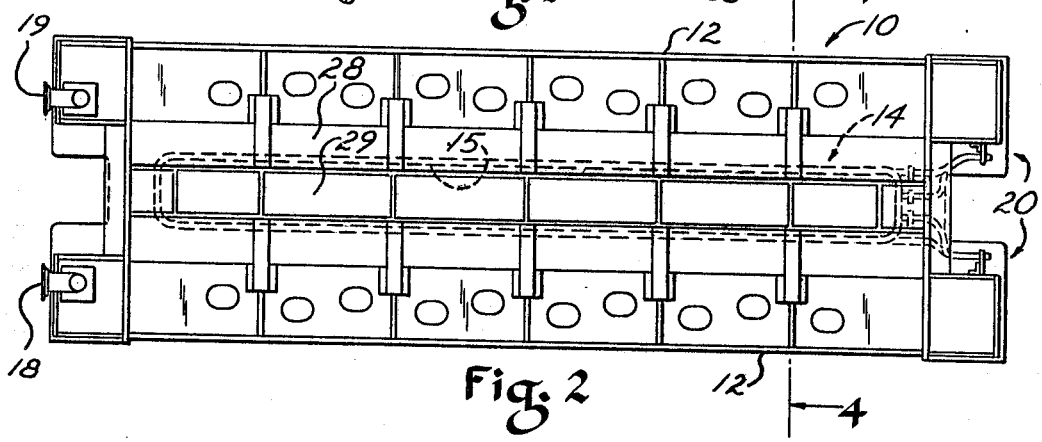
Fig. 2
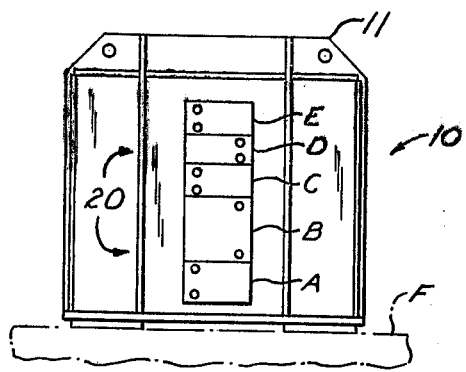
Fig. 3
INVENTOR
Nicholas V. Ross
BY
J.H. SLOUGH
ATTORNEY Feb. 24, 1970  N. V. ROSS  3,497,658
METHOD AND APPARATUS FOR INDUCTION HEATING OF SLABS
Filed March 20, 1968  4 Sheets-Sheet 2

INVENTOR
Nicholas V. Ross
BY
J. H. SLOUGH
ATTORNEY

United States Patent Office 3,497,658
Patented Feb. 24, 1970

3,497,658
METHOD AND APPARATUS FOR INDUCTION HEATING OF SLABS
Nicholas V. Ross, Youngstown, Ohio, assignor to Ajax Magnethermic Corporation, Warren, Ohio, a corporation of Ohio
Filed Mar. 20, 1968, Ser. No. 714,665
Int. Cl. H05b 5/00, 9/06, 9/02
U.S. Cl. 219—10.75          16 Claims

ABSTRACT OF THE DISCLOSURE

An induction heater comprising a multisection inductor coil for statically heating slabs of substantially greater length than width and substantially greater width than thickness, means for separately applying voltage of the same phase to each section substantially proportional to the number of turns in each section whereby substantially constant volts per turn is attained throughout said coil.

---

This invention relates to the induction heating of an elongated load, which load is statically positioned in the heater and substantially greater in length width and of substantially greater width than thickness and consists of one or more slabs, and to improvements in inductor coils of the type disclosed in my copending application, Ser. No. 589,974, filed Oct. 27, 1966, now patent No. 3,424,886.

In general, the above referred to application discloses a liquid cooled, helically wound inductor coil defining an opening therethrough of oblong shape as the coil is viewed in transverse section. Said coil is adapted to receive an elongated load having its longest dimension disposed at right angles to the axis of the coil, parallel with the longer dimension of the oblong opening, whereby the direction of magnetic field within the coil is through a shorter dimension of the workpiece, such as its width. A coil of this configuration is particularly adapted for induction heating of a load consisting of a slab or slabs of considerable length, for example ten or twenty feet or longer. It has been found that the invention provides more uniform heating and a greater electrical efficiency than known devices.

The present invention relates to an induction heater and an inductor coil of the type set forth above wherein the coil is wrapped around the longest dimension of the load and sectioned in the direction of its axis for applying voltage to selected turns of the coil, the voltage applied to each said section being substantially proportional to the number of turns in each said section.

As herein disclosed, the inductor coil is positioned on a vertical axis with the turns of the coil conductor disposed in substantially horizontal planes. This arrangement provides a vertically directed opening through the coil which is oblong in horizontal cross section whereby it is adapted to receive an elongated load comprising one or more slabs of metal positioned on one side edge, the width of the load becoming its vertical dimension.

It will be readily understood that when current is applied to the inductor coil, the direction of the magnetic field of the coil is through the width of the load. This results in the load being heated more quickly and more uniformly than with conventional induction heaters wherein an elongated workpiece is moved endwise through an inductor coil and heated progressively as it passes therethrough. In the use of a heater according to the present invention, the load is statically positioned during the heat cycle; that is, it is heated while at rest and is substantially immovable within the coil during heating as opposed to being moved progressively through the coil during the heating thereof.

It has been found to be difficult, particularly in induction heating of steel, to attain a uniform temperature pattern while using a high power density. Steel slabs are magnetic in the low temperature range and nonmagnetic in the high temperature range; and there is an interim period in the heating of large steel slabs when the center portion remains magnetic while the surface is nonmagnetic. If more power is induced into one portion of the workpiece than another, that portion will overheat. If the induced power is uniform throughout the workpiece, but heat losses are not uniform, a nonuniform temperature pattern can result. Furthermore, the thermal conductivity of steel is low, and heat does not readily flow from one portion of the workpiece to another to quickly equalize the temperature. All of these variables, that is, power density, magnetic properties, heat losses, thermal conductivity, and slab dimensions, affect the distribution of power density over the surface of the slab so that uneven temperature distribution may occur over either or both the length and width of the slab.

It is the primary object of the present invention to provide a heater of the type set forth above which attains a uniform temperature over the entire load being heated.

Another object of the invention is to provide such a heater for very rapidly heating loads with very high power density.

Still another object is to provide a heater having the above characteristics which is capable of accommodating a slab or slabs of variable lengths and widths.

Yet another object is to provide a heater as set forth above which delivers substantially constant effective volts per turn of the coil at the slab or workpiece.

A further object of the invention is to provide an induction heater of the above type wherein the coil is divided into sections along its axis and has control means to separately vary the voltage in certain of the sections.

Another object of this invention is to provide an inductor coil of the type referred to which is mechanically and/or electrically sectioned whereby portions of the coil may be selectively isolated for heating metal slabs of different widths.

Another object of the invention is to provide an improved method for heating elongated loads or slabs of metal.

Other objects and advantages of the invention and the invention itself will be understood by reference to the following description thereof and the accompanying drawings, in which said drawings:

FIGURE 1 is a side elevation of an induction heater according to the present invention;

FIGURE 2 is a top plan view of the induction heater of FIGURE 1;

FIGURE 3 is an end elevation of the induction heater of FIGURES 1 and 2;

Figure 4:
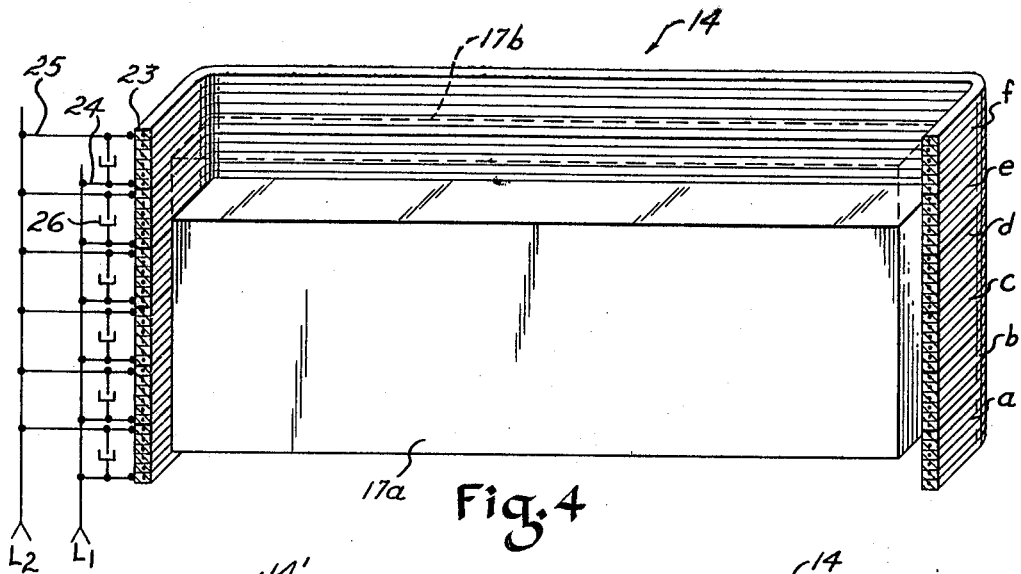
FIGURE 4 is a simplified perspective view of a sectioned coil, the front part thereof being broken away to show a workpiece therein.

Referring now to the drawings in all of which like parts are designated by like reference numerals, and referring particularly to FIGURES 1–3, numeral 10 designates an induction heater comprising a heavy steel frame having upright, spaced end members 11 connected together by elongated, upper and lower, laterally spaced side members 12 and 13. The upper and lower side members 12 and 13 are arranged in laterally spaced pairs along either side of the heater 10 whereby space is provided through the center of the heater for the mounting of an inductor coil 14. The inductor coil is wound or formed about a vertical axis to provide a vertically directed, load-receiving opening 15 of oblong shape as best shown in broken lines in FIGURE 2. The end members 11 are mounted upon a suitable supporting surface or floor F on either side of a pit 16 whereby the opening 15 of the inductor coil 14 is disposed directly over said pit. A load in the form of a heavy, elongated metal slab 17 having a substantially greater length than width and a substantially greater width than thickness is shown positioned within the pit 16 below the central portion of the heater 10. The slab 17 is adapted to be moved upwardly from the pit 16 into the opening 15 of the inductor coil from the full-line position to the broken position of FIGURE 1 by suitable lift means such as the support beam 50.

With the load or slab 17 statically positioned within the heater 10 as illustrated in FIGURE 1, current is applied to the inductor coil 14 whereby the magnetic field of the coil is directed through the load at right angles to the longitudinal axis thereof or through what would normally be referred to as the width of said slab. Thus the slab 17 is raised to the desired temperature in a heating pattern that is substantially uniform and simultaneous throughout the entire length of said slab, the slab being at rest during the heating cycle.

The frame of the induction heater 10 and the means for mounting the inductor coil 14 therein may be of any suitable form such as that disclosed in detail in copending application Ser. No. 670,046, filed Sept. 25, 1967. The inductor coil 14 shown comprises a helical conductor which is preferably hollow whereby it is adapted for water cooling, and the heater frame is preferably provided at one end thereof with a suitable water inlet 18 and outlet 19. The opposite end of the heater is provided with suitable electrical terminal means 20 which are further shown in FIGURE 3.

FIGURE 4 shows in simplified form the inductor coil 14 constructed and energized according to one embodiment of the present invention. The coil 14 is preferably a single phase coil divided along its axis into a plurality of coil sections *a*, *b*, *c*, *d*, *e*, and *f*, it being understood that each section comprises a plurality of turns of a coil conductor 23. For purposes of illustration, the coil 14 has six sections of equal axial length and equal number of turns and surrounds a load or slab 17*a*. At the left-hand side of FIGURE 4, there are shown a pair of leads $L_1$, $L_2$ for supplying single phase current to the sections *a*, *b*, *c*, *d*, *e* and *f* at a predetermined voltage. Each coil section is separately connected across leads $L_1$ and $L_2$ by lines 24 and 25, respectively, in parallel with power factor control capacitance 26.

A load or slab 17*a* of substantially greater length than width and substantially greater width than thickness is positioned with its bottom edge generally midway between the upper and lower ends of the bottom section *a* and its upper edge disposed substantially midway between the upper and lower ends of the number two section *e*. A larger load or slab, indicated by dotted lines at 17*b*, has its upper edge disposed substantially midway between the upper and lower ends of the uppermost coil section *f*.

Figures 5, 6:
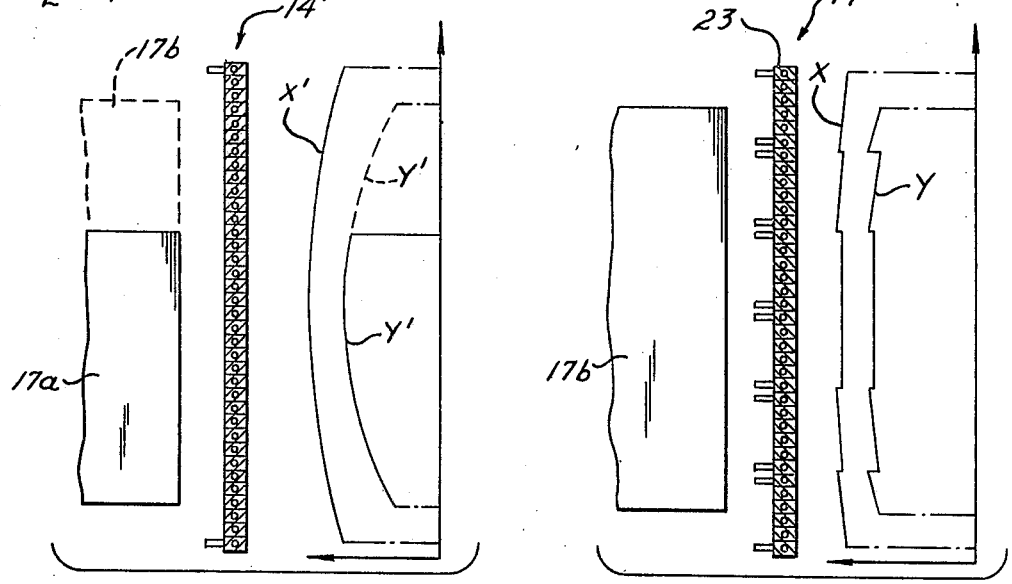
FIGURE 5 is a diagram showing the pattern of flux or volts per turn and induced power density delivered in an unsectioned coil.
FIGURE 6 is a diagram showing the pattern of flux or volts per turn and induced power density delivered in the sectioned coil of FIGURE 4.

The relationship between the primary and secondary current, that is, the current applied to the coil and that induced into the load, is substantially different at the ends of a simple, unsectioned coil from that in the middle of the coil, as illustrated by a coil 14′ in FIGURE 5; a similar relationship is shown in FIGURE 6 in connection with the sectioned coil 14 of FIGURE 4 for the purpose of comparison with the simple, unsectioned induction coil 14′. If a simple induction coil 14′ is energized in the conventional manner, the flux or volts per turn within the coil tends to be substantially reduced toward the ends as indicated by the curved line X′. As a result, the induced power density in the load also falls off toward the ends proportional to the square of the flux or voltage as indicated by the full and broken curve line Y′. If, as shown in FIGURE 5, a narrow slab 17*a* is inserted into the inductor coil 14′, said slab or workpiece will tend to have a high power density induced at the top thereof and a low powered density at the bottom thereof, and substantial temperature differentials will result with the top of the slab being overheated. If on the other hand a wide slab 17*b* is inserted, the tendency will be for the slab to be relatively cold at the top and bottom while overheating in the center.

The coil of the present invention attains a substantially uniform heat pattern by supplying substantially constant effective volts per turn over the working length of the coil with the result that constant power density is delivered throughout the width of the slab. The principle is diagrammatically shown in FIGURE 6 wherein the flux or volts per turn is indicated by the line X and the induced power density is indicated by the line Y. By applying the voltage separately to the sections *a* through *f* it will be readily seen that the induced power density Y tends to level off throughout the entire width of the slab thereby providing for more uniform heating of the slab.

It has been found that a coil having a sufficient number of sections will uniformly heat slabs of various widths provided that the load is kept within the coil and that the coil overlaps or extends beyond the upper and lower edges of the load. For optimum results it is also preferred that the upper and lower edges of the load are disposed substantially in the medial region of one of the coil sections.

An additional problem which arises is that of heat losses which exist at the bottom and/or top of the load. Depending upon the specific construction of the heater frame, it may not as a practical matter be possible to completely shield the upper and lower edges of the load against heat loss through radiation. In the induction heater 10 shown in FIGURES 1–3, heat loss is substantially eliminated at the top of the coil by shield members 28 and 29, whereas because of the use of the support beam 50 for inserting, holding and removing a workpiece, greater heat losses occur at the bottom of the coil. To overcome these heat losses, the present invention provides for applying slightly more volts per turn to those coil sections which are directly effecting the heating of the top and bottom edges of the load. This is accomplished by means of autotransformers and capacitors described in connection with the electrical diagram of FIGURE 7.

Figure 7:
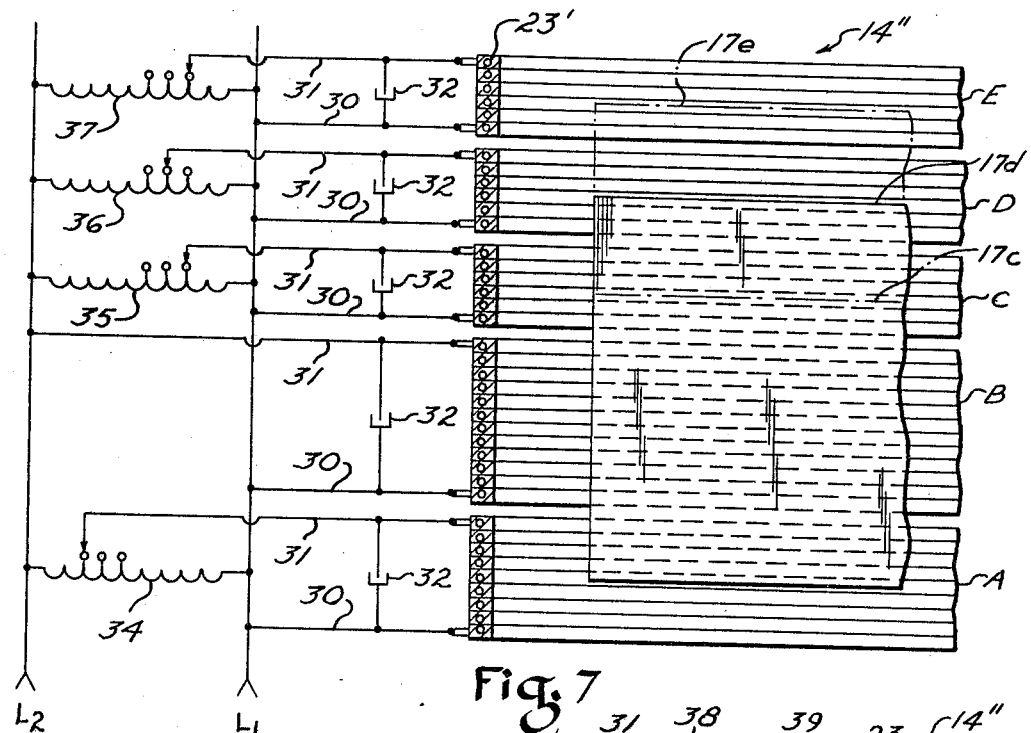
FIGURE 7 is a simplified sectional view through an end portion of a modified sectional coil showing a form of electrical connections and control means therefor.

In the modification of FIGURE 7, an inductor coil 14″ is divided into a plurality of sections A, B, C, D, and E. Each section of the coil 14″ comprises a plurality of turns of a preferably hollow coil conductor 23′, and it will be noted that the coil sections comprises various numbers of turns and, therefore, have various axial dimensions. The section B is the largest of the sections and is adapted to encompass the middle portion of the vertical dimension of a relatively narrow load or slab 17*c* shown in broken line. The coil section A has a smaller axial dimension than the section B, the bottom edge of the load or slab being disposed substantially midway of said section A. The sections C, D, and E are the smallest sections and as herein illustrated, are all of uniform axial dimension. The upper edge portion of the slab 17c is adapted to project substantially halfway through the coil section C, the upper edge portion of a relatively larger slab 17d, shown in full line, is adapted to project substantially halfway through the section D, and the upper edge portion of a still larger slab 17e, shown in broken line, is adapted to project substantially halfway through the uppermost coil section E. From the foregoing, it will be seen that the upper and lower edge portions of any of the slabs 17c, 17d, and 17e are vertically overlapped by one of the separately energized coil sections.

The current is supplied to the coil section B from main leads $L_1$ and $L_2$ by lines 30 and 31, respectively, and has power factor control capacitance 32 connected in parallel therewith. The coil sections A, C, D, and E are similarly connected to the leads $L_1$ and $L_2$, with the exception that the lines 31 thereof are connected through voltage regulating autotransformers 34, 35, 36, and 37, respectively.

By means of the autotransformers 34–37, the voltage in the coil sections A, C, D, and E can be varied. To maintain substantially constant volts per turn over the entire coil, the voltage applied to the various size sections is varied in proportion to the number of turns in the sections. For example; coil section B as illustrated has twice as many turns as sections D and E, and section A has three-fourths the number of turns in section B. Therefore, if 2000 volts are applied to section B, 1000 volts are applied to each of the sections C, D, and E and 1500 volts are applied to section A. If desired, slight additional volts per turn may be made available to those sections encompassing the upper and/or lower edges of the load to compensate for heat losses at these locations. It has been found that generally no more than a 5 percent increase in voltage is necessary at the upper and lower edges of the load, depending upon the heat losses in these areas. These variations in voltage are controlled by the autotransformers 34–37.

As illustrated in FIG. 7, the autotransformer 36 of coil section D has been adjusted to provide slightly greater volts per turn to compensate for heat losses adjacent to the upper edge of the workpiece 17d; the autotransformer 35 of the coil section C is adjusted to deliver slightly lower volts per turn to match the volts per turn of the largest coil section B; and the autotransformer 34 of the lowermost section A is adjusted to deliver slightly higher volts per turn than section D to offset the increased heat losses at the bottom open end of the coil 14″.

The adjustments of the autotransformers in FIG. 7 are suggestive of those preferred in an induction heater of the type shown in FIGURES 1–3 wherein the top of the heater can be readily closed and insulated thereby greatly reducing heat loss and wherein the bottom of the heater necessarily remains substantially open, resulting in greater heat losses in this area. This arrangement is given by way of illustration only and it will be readily understood that the principle herein disclosed could be applied regardless of which end of the coil the workpiece was inserted into and regardless of the orientation of the axis of the coil, as long as the relationship between the coil and load remains the same as described. It will also be readily understood that in the heating of the smallest slab 17c, slightly greater volts per turn would be applied to section C, and that in heating the largest slab 17e, the greater volts per turn would be applied to the topmost coil section E.

It will be understood from the foregoing that all of the coil sections may be of equal axial length, or some or all of them may be of unequal length, depending upon the anticipated size and range of loads to be heated.

Figure 8:
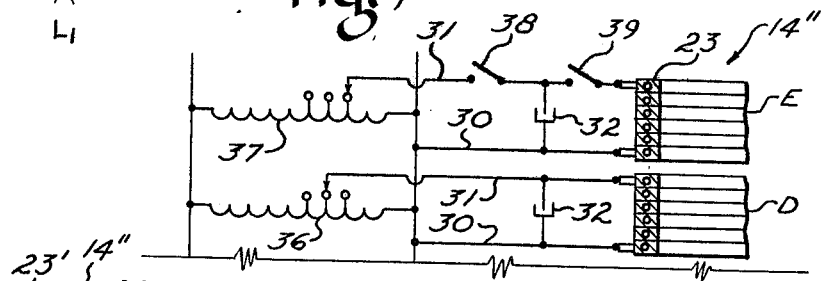
FIGURE 8 is a detail of a portion of FIGURE 7 showing a modification thereof.

FIG. 8 of the drawings shows a modification applicable to FIG. 7 wherein a pair of switches or contacts 38 and 39 are disposed in the line 31 of the uppermost section E. The contacts 38 and 39 are disposed on either side of the capacitance 32 whereby to completely de-energize the uppermost coil E. Said contacts would be open when heating a load or slab 17d wherein it would not be necessary to energize the uppermost coil at all. It will be readily understood that similar contacts could be inserted in the line 31 of any section not needed for heating a workpice of a given size or could be similarly positioned for isolating selected coil sections of a coil of any particular, sectioned design.

Figure 9:
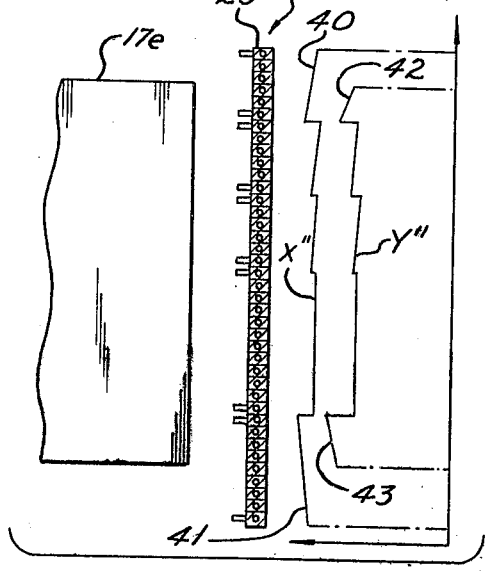
FIGURE 9 is a diagram showing the pattern of flux or volts per turn and induced power density delivered in the sectioned coil of FIGURE 7.

FIG. 9 is a diagram similar to the diagrams of FIGURES 5 and 6 and relates particularly to heating the workpiece 17e in FIGURE 7. Here it will be noted that the volts per turn over the working length of the coil 14″ is substantially level as indicated by the line X″. It will be further noted that the upper and lower portions 40 and 41 of the line X″ are stepped outwardly to indicate slightly increased volts per turn in the uppermost coil E and the lowermost coil A, respectively, such as would be the case in the heating of the largest load or slab 17e. The induced power density line is shown at Y″ and also has outwardly stepped portions 42 and 43, corresponding to the increased power density effected by the coils E and A respectively. As a result of the sectioning of the coil and the separate application of current to the sections as described, the voltage in each turn of the coil is close to the average volts per turn of the entire working length of the inductor coil.

Figure 10:
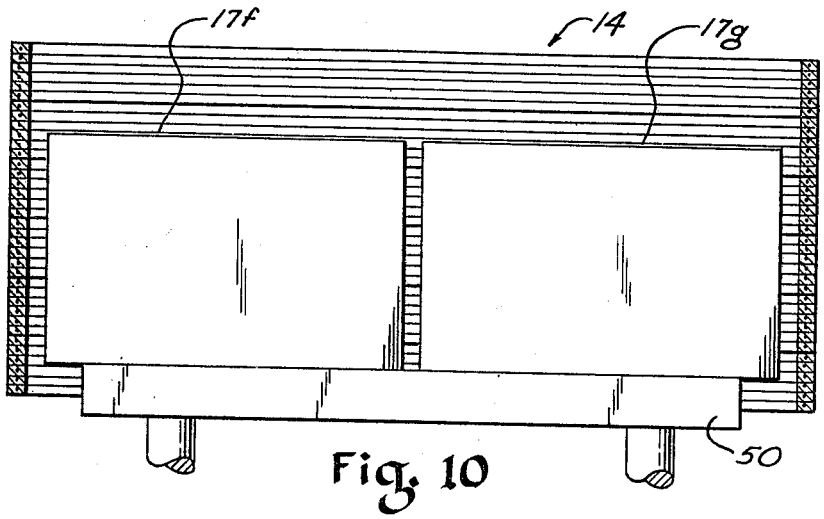
FIGURE 10 is a vertical section through the longer transverse dimension of a coil of this invention showing an elongated load comprising slabs disposed end-to-end within the coil.

FIGURE 10 illustrates the manner in which a load may comprise a plurality of separate slabs 17f and 17g positioned in end-to-end relation upon the support beam 50 within an inductor coil of this invention. Two of said slabs are shown in FIGURE 10, but it will be readily understood that more than two slabs may be so arranged. The proportion of the load remains the same as that hereinabove described; that is, the load has a substantially greater length than width and a substantially greater width than thickness. It will also be noted that the load comprising the slabs 17f and 17g is positioned within the inductor coil 14 with end portions of the coil overlapping and extending beyond the upper and lower edges of the load, and that such load could be provided in varying widths or vertical dimensions.

Figure 11:
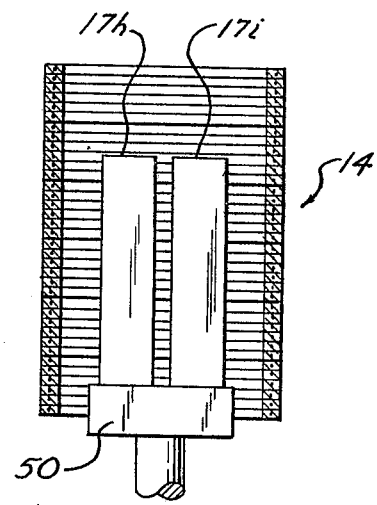
FIGURE 11 is a vertical section through the shorter transverse dimension of a coil of this invention showing a load comprising slabs disposed side-by-side within the coil.

FIGURE 11 shows in end view another arrangement of the load wherein elongated slabs 17h and 17i are positioned upon the support beam 50 in parallel, side-by-side relation.

Thus it will be understood that the term "load" as used in the specification and claims refers to either a single, elongated slab of metal or a plurality of metal slabs or workpieces arranged end-to-end, side-by-side, or in any other suitable manner.

From the foregoing, it will be seen that in an induction heater of the type disclosed herein, a slab or slabs of different widths can be heated efficiently in the same inductor coil wherein the volts per turn of the coil are kept substantially at or near the average volts per turn over the entire working length of the coil. Where necessary, a slightly greater voltage can be applied to those portions of the coil surrounding the upper and lower edges of the workpiece to compensate for heat losses, and if desired, means may be provided for utilizing only so much of the coil as is necessary to heat the load.

It will be understood that many changes in the details of the invention as herein disclosed and illustrated may be made without, however, departing from the spirit thereof or the scope of the appended claims.

What is claimed is:

1. A multisection single phase induction coil for uniformly heating a slab of substantially greater length than width and of substantially greater width than thickness, said coil having an opening of oblong shape transverse to the axis of said coil; said slab being positioned statically within said opening during the heating cycle with the longest dimension thereof disposed substantially parallel with the longest dimension of said opening, and the width thereof disposed in a plane substantially parallel with the axis of the said coil; said coil extending in an axial direction beyond the width of the slab; each section of said coil comprising a number of turns of said coil; a single phase adjustable voltage source, and means whereby voltage substantially of the same phase is derived from said source and applied to each said section to deliver constant volts per turn in each said section, to heat the slab.

2. A multisection inductor coil as set forth in claim 1; each said section comprising the same number of turns of said coil and having the same axial dimension.

3. A multisection inductor coil as set forth in claim 1; said coil comprising a plurality of sections whereby it is adapted to heat slabs of varying widths.

4. A multisection inductor coil as set forth in claim 1; said slab projecting in the direction of the axis of said coil across portions of at least two of said sections and one of said sections substantially overlapping each axially directed edge portion of the slab during heating thereof.

5. A multisection inductor coil as set forth in claim 4; each axially directed edge portion of the slab extending substantially halfway through one of said sections.

6. A multisection inductor coil as set forth in claim 1; means for slightly increasing the voltage to those sections adjacent to the axially directed end portions of the slab to compensate for heat losses at said end portions.

7. A multisection inductor coil for uniformly heating slabs of substantially greater length than width of substantially greater width than thickness, said coil comprising a plurality of coaxial coil sections; each said section comprising a number of turns of a conductor means defining an opening of oblong shape transverse to the axis of said coil adapted to receive each of the said slabs with its longest dimension disposed parallel with the longer dimension of said opening and its width disposed parallel with the axis of said coil; certain of said sections having a greater number of turns than other of said sections; each of said slabs being statistically positioned within said coil during heating whereby said coil extends in an axial direction beyond the width of each of the said slabs; means for applying voltage of the same phase separately to each said section substantially proportional to the number of turns in each section whereby substantially constant volts per turn is attained throughout said coil.

8. A multisection inductor coil as set forth in claim 7; each axially directed edge portion of each of the said slabs extending into the central portion of one of said sections.

9. A multisection inductor coil as set forth in claim 8; said coil having sections disposed adjacent to said ends of said coil having means for slightly increasing the voltage to said end sections to compensate for heat losses at the axially directed edge portions of each of the said slabs.

10. A multisection inductor coil as set forth in claim 9; said coil being disposed on a vertical axis with one end directed downwardly, said one end being open to receive said slabs; said coil comprising a large coil section adapted to encompass the central portion of a relatively small slab, a relatively smaller coil section adapted to encompass the lower edge portion of any slab disposed in said coil, and a plurality of small coil sections disposed above the central section whereby said coil is adapted to heat slabs of various widths.

11. A multisection inductor coil as set forth in claim 10; said relatively smaller and said small coil sections having means for slightly increasing the voltage thereto whereby said coil is adapted to compensate for heat losses at the axially directed edge portions of various size slabs.

12. A multisection inductor coil as set forth in claim 11; means for isolating at least the uppermost of said small sections when heating slabs of smaller widths.

13. The method of heating metal slabs of substantially greater length than width and substantially greater width than thickness in a coil having conductor means defining an opening of oblong shape transverse to the axis of the coil; disposing at least one slab within the coil whereby the coil overlaps the edges of said at least one slab in an axial direction; and separately applying voltage to a plurality of sections of the coil along the axis of the coil substantially proportional to the number of turns in each section whereby to attain substantially constant volts per turn over the working length of the coil.

14. The method as set forth in claim 13, including applying slightly higher volts per turn at the end sections of the coil whereby to compensate for heat losses at the axially directed edge portions of the slab.

15. The method as set forth in claim 13, wherein a plurality of metal slabs disposed end-to-end along the longer dimension of the coil are heated.

16. The method as set forth in claim 13, wherein the slabs comprise a plurality of metal slabs disposed side-by-side across the shorter dimension of said coil.

References Cited

UNITED STATES PATENTS

| | | | |
|---|---|---|---|
| 2,291,862 | 8/1942 | Bailey | 219—10.57 |
| 2,720,577 | 10/1955 | Lackner | 219—10.75 |
| 2,736,788 | 2/1956 | Nack et al. | 219—10.75 |
| 2,748,240 | 5/1956 | McArthur | 219—10.75 |
| 2,838,641 | 6/1958 | McArthur | 219—10.75 |
| 2,849,584 | 8/1958 | Tudbury | 219—10.75 |
| 2,875,995 | 3/1959 | Troglione | 263—6 |
| 2,978,237 | 4/1961 | Frank | 263—6 |
| 3,120,596 | 2/1964 | Sommer | 219—10.75 |
| 3,279,774 | 10/1966 | Biro | 263—6 |
| 3,291,954 | 12/1966 | Scheffler | 219—10.71 |

JOSEPH V. TRUHE, Primary Examiner

L. H. BENDER, Assistant Examiner

U.S. Cl. X.R.

219—10.57, 10.79